Figure 1:
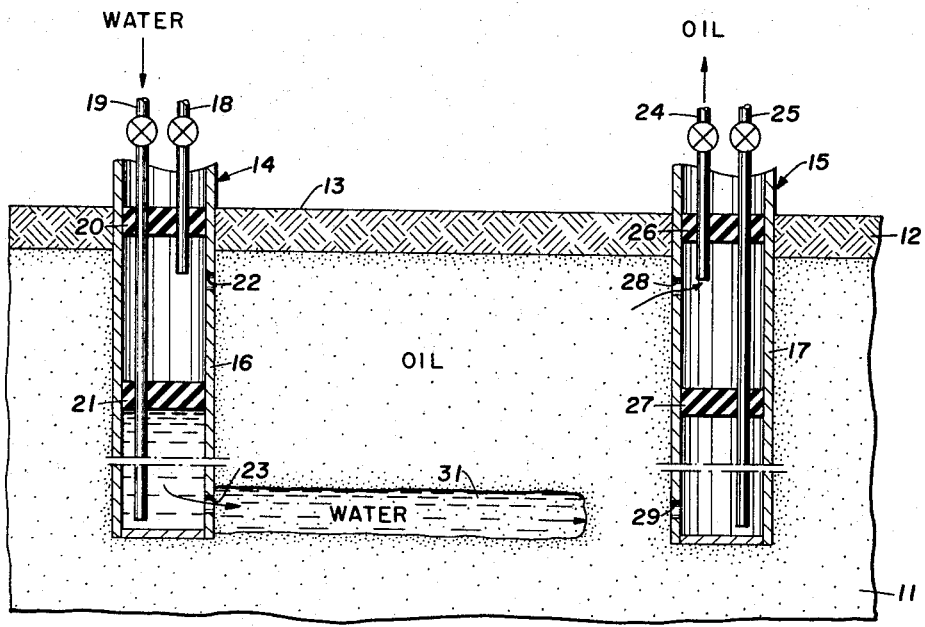

AZIZ S. ODEH
BILLY J. DOTSON
INVENTORS

BY Emil J. Bednar
ATTORNEY

AZIZ S. ODEH
BILLY J. DOTSON
INVENTORS

BY Emil J. Bednar
ATTORNEY

United States Patent Office 3,371,711
Patented Mar. 5, 1968

3,371,711
VERTICAL FLOODING METHOD OF OIL RECOVERY
Aziz S. Odeh, Dallas, and Billy J. Dotson, Grand Prairie, Tex., assignors to Mobil Oil Corporation, a corporation of New York
Filed May 16, 1966, Ser. No. 550,346
7 Claims. (Cl. 166—9)

This invention relates to a method for the recovery of oil from a subterranean reservoir. More particularly, it relates to such method in which is employed the vertical flooding of the reservoir by a horizontally oriented flood front of injected fluid being moved vertically.

Oil cannot be recovered from many subterranean reservoirs solely by primary methods, such as pumping or natural flow. In these reservoirs, external energy must provide for the recovery of the in-place oil. This energy may be supplied to the reservoirs by the injection of an oil-displacing fluid. There are many usable displacing or flooding fluids and included are water, natural gas, and other hydrocarbon fluids. Nonhydrocarbon fluids, such as carbon dioxide and ammonia, and in aqueous or nonaqueous environments, may also be used as displacing fluids. The primary function of these fluids is to displace the oil through the reservoir to a production well where it can be recovered. Many problems are involved in such oil displacement procedure. One problem is the amount of oil which remains bypassed in the reservoir by the low volumetric sweep of the displacing fluid.

The low volumetric sweep of the displacing fluid resides in many factors. One factor is instability of the fluid-oil interface, which results in fingering, cusping, and coning effects. These latter effects disrupt the planar configuration of the flood front or macroscopic fluid-oil interface.

Volumetric sweep of the fluid is improved by reducing the stated undesired effects when the fluid-oil interface, which is horizontally oriented, moves vertically through the oil reservoir. However, it is difficult to provide adequate horizontal distribution of the displacing fluid in the reservoir prior to undertaking its vertical movement. This horizontal distribution of the flooding fluid in the past required the use of horizontal and specially oriented fractures, injection solely into selected high permeability strata, or the like. These procedures are found objectionable since all employ well arrangements and fluid-handling steps more complicated than merely required for injection of flooding fluid and for production of displaced oil from wells penetrating the reservoir.

This invention improves upon the foregoing procedures for oil recovery and has as its objects to provide:

(a) A method of improved volumetric sweep in the displacing and recovering of oil by a flooding fluid moved vertically through a reservoir;

(b) A method of the described character in which conventional fluid injecting and producing well arrangements and procedures can be employed;

(c) A plurality of cooperating steps wherein a flooding fluid is initially displaced horizontally through a reservoir to a desired areal extent before being moved vertically; and (d) A method for the vertical flooding of a reservoir with a displacing fluid whose horizontal extension is obtained prior to any significant vertical movement without the difficulties suffered from prior known methods.

These and further objects will become apparent when considered in conjunction with the following detailed description including drawings, and the appended claims.

Figure 2:
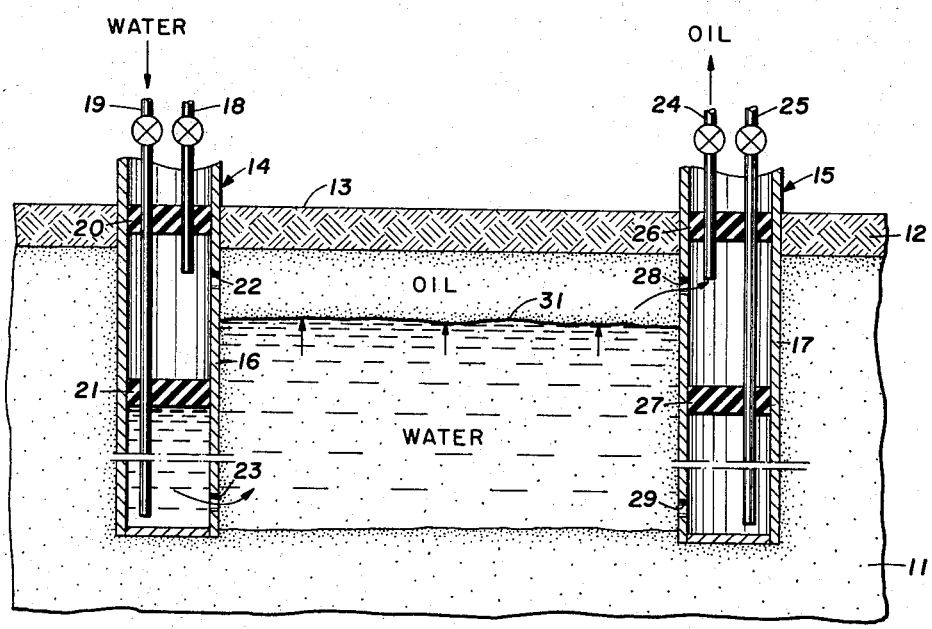
Figure 3:
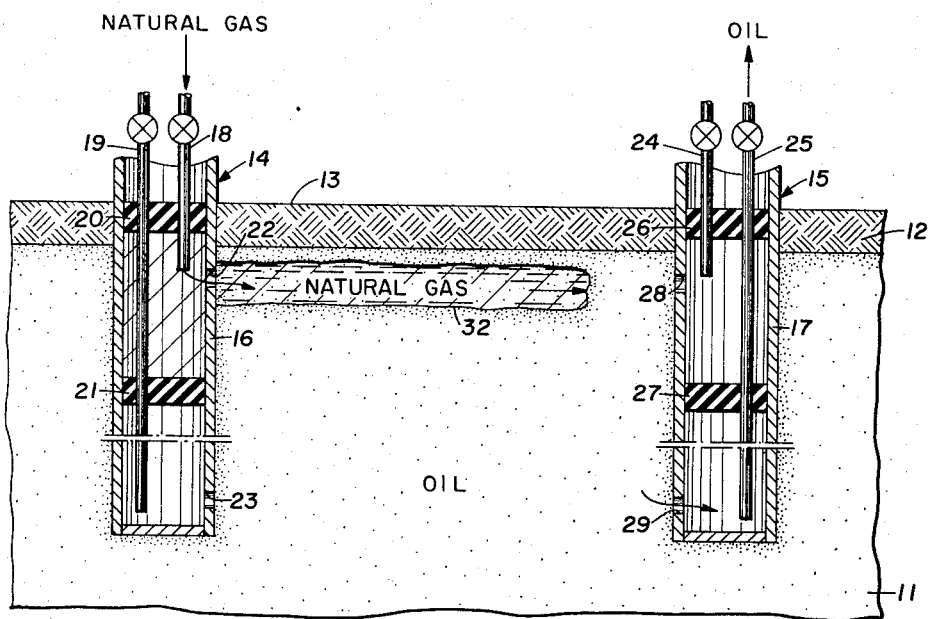
Figure 4:
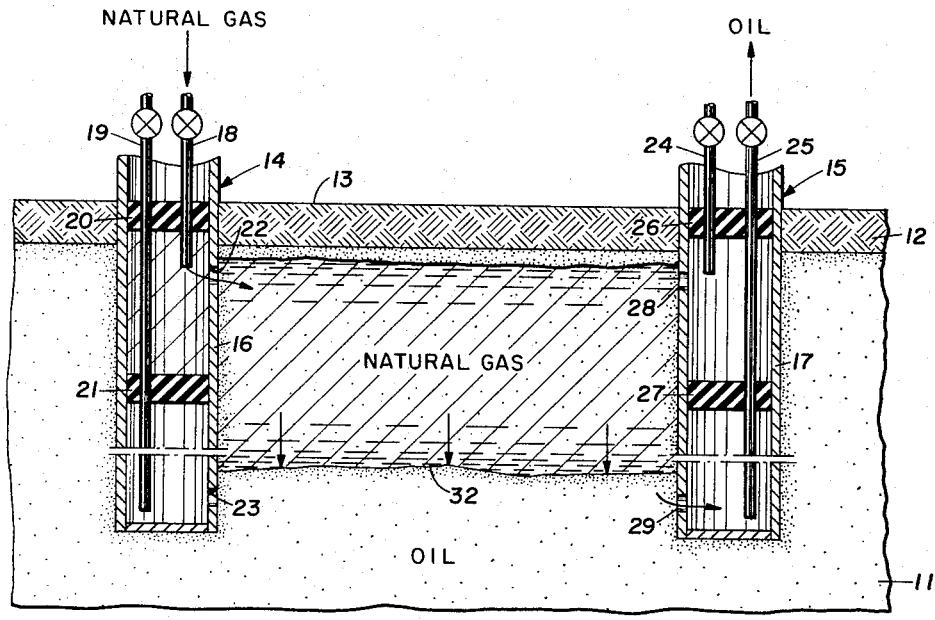

The drawings in the various figures illustrate a reservoir, in vertical section, provided with suitable well constructions for practicing the method of this invention. FIGURES 1 and 2 illustrate one embodiment of the present method wherein water is the displacing fluid; and FIGURES 3 and 4 illustrate another embodiment of the present method wherein natural gas is the displacing fluid.

This invention is a method employing the vertical flooding of a reservoir with a displacing fluid where such fluid is injected at selected rates, each within a critical range. Initially, displacing fluid is injected at an upper or lower horizon, depending upon said fluid being less or more dense than the in-place oil, and at a certain rate so as to be displaced substantially only horizontally at such horizon until it extends through the desired horizontal extent across the reservoir. Thereafter, the fluid is injected at another certain rate, larger than its initial injection rate, to expand vertically through the reservoir the horizontally disposed displacing fluid. By these steps, the fluid displaces, with greatly improved volumetric sweep, the oil from the reservoir by avoiding disruption of the planar macroscopic fluid-oil interface into fingers, or cusps and cones at the points of fluid injection, and oil recovery in the reservoir. Additional steps are practiced in cooperative conjunction with the injection of the displacing fluid for producing the oil from the reservoir in the various embodiments of this invention. The method of this invention in recovering oil from a reservoir resembles in its operation the displacement of oil from a surface storage tank with the displacing fluid.

The present invention can be practiced in any reservoir and with any one of many displacing fluids. These fluids must be different in density from the in-place oil, and can be liquid or gaseous, and miscible or immiscible with such oil. One such reservoir is shown in the drawings and will be later described. The embodiments of the present method can be employed with the same reservoir as is shown in FIGURES 1, 2, 3 and 4. For this purpose, the reservoir and well arrangements in the various figures have like structures and bear the same numeral designations for convenience in description.

A subterranean reservoir 11 is shown in FIGURES 1–4 from which oil is recovered by the present method. The reservoir 11 may be of any geological formation, such as dolomite, limestone, or sandstone. It is usually covered with an overburden 12 and extends to some vertical dimension below the earth's surface 13. The reservoir 11 may rest upon a subsurface support which need not be considered for practice of this method.

Well means are provided for conveying fluids between the earth's surface 13 and the reservoir 11. The well means may be provided by an input well 14 and an output well 15, each extended vertically downwardly into the reservoir 11. Preferably, the input and output wells 14 and 15 are spaced apart a distance greater than the vertical dimension of the reservoir 11 penetrated by these wells. The input well 14 and output well 15 have casings 16 and 17, both sealed at the overburden 12 and extending into the reservoir 11. The input well 14 may carry conduits 18 and 19 which extend from the earth's surface 13 downwardly into the upper and lower horizons of the reservoir 11. Packer means 20 and 21 provide fluid isolation of the conduits 18 and 19 within the input well 14 at the overburden 12 and between the upper and lower horizons of the reservoir 11. The casing 16 has openings 22 and 23 in its sidewall surface adjacent the ends of the conduits 18 and 19, respectively. A similar arrangement is employed in output well 15 wherein conduits 24 and 25 extend downwardly therethrough and are fluidly isolated by packer means 26 and 27 at the overburden 12 and between the upper and lower horizons of the reservoir 11. Openings 28 and 29 in the casing 17 reside adjacent the ends of the conduits 24 and 25, respectively. Valve means may be provided at the upper extremities of the conduits 18 and 19, and conduits 24 and 25, for regulating the flow of fluids between the earth's surface 13 and the upper and lower horizons of the reservoir 11. This particular arrangement of well means can be employed with facility for practicing the various embodiments of the method. However, other mechanical arrangements of well construction may be used as is apparent to those skilled in the art.

In describing this first embodiment of the present method, particularly, reference now will be made to FIGURE 1. In this embodiment, water is preferably injected as the displacing fluid through the input well 14. However, any fluid more dense than the in-place oil may be used. The conduit 19 connected to any suitable pressurized source, carries water to the opening 23 for entry into the lower horizon of the reservoir 11. The water is injected at a certain critical rate to obtain the desired horizontal areal distribution between the input well 14 and the output well 15. For this purpose, water is injected at the rate where the magnitude of the viscous forces is decreased relative to the magnitude of the gravitational and capillary forces, which forces exist between the water and oil, and the reservoir, sufficiently to maintain the water-oil interface 31 substantially horizontal until such injected water extends to the desired extent from the input well 14 toward the output well 15. It has been found that there is a particular injection rate at which the water will move only horizontally through the reservoir 11 without any significant vertical expansion. This rate will be determined by the physical character of the reservoir 11. In some cases, it usually may be moved at a fraction of a foot per day. Greater injection rates cause the water to expand vertically rather than predominantly horizontally across the reservoir 11.

It is difficult to define this certain rate mathematically at this time. However, it is known that the certain rate, required to obtain the desired result, exists for each reservoir and each injected fluid. This horizontal displacement characteristic is believed to depend upon the balancing of the several forces concerning horizontal and the vertical movements of the injected fluid in the reservoir 11 until the resulting pressure gradients cause the fluid to move only substantially in the horizontal. The displacement of oil in the porous system of the reservoir by the flooding fluid occurs as a result of the applied viscous, gravitational, and capillary forces. Of course, the spatial distribution of the various fluids in the reservoir 11 will be determined by the relative magnitude of these forces. The applied viscous forces are commonly termed "the forces created by pressure differentials inherent in the laminar or nonturbulent flow of fluids" as defined by Darcy's equation. The gravitational forces control the tendency of the various fluids such as oil, gas, and water to separate vertically into horizontal zones according to their densities. Usually, the capillary forces prevent complete phase separation in the oil reservoir 11. The capillary forces are the result of a combined effect of surface and interfacial tensions, pore sizes and shapes, and the weighting properties of the reservoir stratum.

It is recognized that when the pressure gradients about a well become comparatively high due to fluid production at high rates, the magnitude of gravitational forces effects relative to the other forces becomes small. At such time, the pressure differentials create fingering, cusping, and coning between the fluids. For example, coning by an injected fluid can be obtained between two spaced-apart wells when the pressure differential between the wells becomes sufficiently high. At this time, the injected fluid at a high injection rate cannot form a stabilized front or bank before traversing the reservoir.

The injection rate of the displacing fluid controls the relative magnitudes between these forces. Certain, but relatively small, rates of injection reduce the viscous forces by lowering the pressure gradient in the surrounding reservoir 11. The gravitational forces are thereby increased in relative magnitude and overcome the tendency of the injected fluid to expand vertically. Therefore, the injection of the displacing fluid, at this certain rate, will force the water into the reservoir 11 in the horizontal direction in much the same manner as when water is first introduced at the bottom of a tank filled with oil.

This necessary certain rate of water injection can be determined experimentally using adequately sized core samples of the reservoir 11 which give a true physical representation. An approximation of this rate can also be made by calculations from the various equations employed to define the movement of fluids, in two phases, through a reservoir. For this purpose, data of fluids and various physical characteristics of the reservoir 11, including directional permeability, fluid viscosities, porosity, density differentials between the fluids therein, and bed thicknesses, are taken into consideration. Reference may be taken to any of the texts in this regard, such as the volume entitled Physical Principles of Oil Production, by Morris Muskat, published in 1949.

If desired, the horizontal displacement of the injected water may be followed in its traverse of the reservoir 11 by means of monitoring wells (not shown) placed at selected intervals between the input and output wells 14 and 15, whereby an indication of the fluid locations and identifications may be made. Other means of monitoring the injected water may be used if desired.

The oil is produced into the output well 15 from any horizon in the reservoir 11, but preferably flows through the conduit 24 via the opening 28, simultaneously with the injection of water into the reservoir 11. The oil is produced at a rate not above the rate at which water is being injected through the input well 14. This arrangement provides for maintaining the pressure differential distributions throughout the reservoir 11 substantially constant. It is to be noted that should the pressure differential between the openings 23 and 28 increase more than any small amount, the injected water interface 31 would be adversely affected by disruption of its planar surface with the undesired formation of fingering, cusping, or coning towards the opening 28. The interface 31, by the present method, will therefore remain planar since its various parts are not subject to regions of differential pressure gradients.

In carrying out these steps, no fluid is produced through the conduits 18 and 25. If the conduit 25 were open to flows of oil while water was injected, an induced coning would result by creating pressure differentials in the regions of the oil reservoir 11 about the opening 29. This region with lines of equal pressure would be roughly of a spherical configuration. Therefore, the interface 31 would tend to enlarge vertically when oil is produced from more than one horizon. The same effect is observed when water coning is obtained at a production well from an underlying water drive.

When the injected fluid extends horizontally substantially to the desired lateral distance from the input well 14 towards the output well 15, the rate of water injection is increased to another certain rate above the first defined rate. The prior discussion of forces created by rates of fluid injection is equally applicable here. The increased rate of injection increases the relative magnitude of the viscous forces to the gravitational and capillary forces so that the injected water will expand vertically in the direction of decreasing pressure. In this embodiment, the water therefore will move vertically upward. However, this new rate should not be increased to such magnitude that the reservoir 11 is fractured continuously thereby.

At this time, oil is continued to be produced from the output well 15 through the opening 28 from conduit 24 at an increased rate but not exceeding the rate at which water is now being injected. Preferably, this rate is about the rate at which water is being injected. Again, the pressure differential distributions within the oil reservoir 11 between the input and output wells 14 and 15 are maintained but decrease uniformly in the vertical. This provides, as seen in FIGURE 2, for movement of the interface 31 of the injected water vertically through the reservoir 11 without disruption of its planar surface by fingering, cusping, or coning.

More particularly, the rate of oil production from the conduit 24 is controlled and maintained co-equally with the increased certain rate of water injection. However, this rate should be always slightly below that critical rate of petroleum production where the opposing differential gravitational forces which act upon the interface 31 are exceeded by the pressure gradients in the reservoir 11 about the output well 15 sufficiently to disrupt any part of the planar interface 31. It will be apparent under these conditions that a rather high rate of oil production may be obtained without a premature breakthrough of the injected water into the output well 15. Also, a stabilized bank of fluid-displaced oil is formed and maintained throughout oil production.

The oil production from the output well 15 may be continued in the preceding manner until a substantial portion of the reservoir 11 is filled with the injected water and the interface 31 reaches the opening 28. Thereafter, oil will be coproduced with the injected water from the output well 15. Since the interface 31 remains planar until this time, the volumetric sweep of the injected water is greatly increased over other vertical flooding procedures where fingering, cusping, and coning effects are suffered.

Another embodiment of this invention is employed as seen in FIGURES 3 and 4 whenever the injected fluid through the input well 14 is less dense than the oil in the reservoir 11. Preferably, in this case the fluid is a light hydrocarbon. In this embodiment, the steps are practiced by criterion identical with those of the preceding embodiment. However, the injected fluid, for example natural gas, is injected through the conduit 18 in the well 14 via the opening 22 into the upper horizon of the reservoir 11. The conduit 19 is closed to fluid flows. The injection is maintained at a certain rate as has been described relation to the injection of water. As a result, the injected fluid, for example natural gas, will pass through the upper horizon substantially horizontally to extend from the input well 14 towards the output well 15. At this time, the injected natural gas will maintain a planar interface 32. After the natural gas extends to the desired horizontal extent, the injection rate is again increased to the certain increased rate where the gas-oil interface 32 of the injected natural gas moves vertically downwardly towards the opening 29 in the output well 15. The oil is produced from the output well 15 through the conduit 25 at rates adjusted to those determining the injection of the gas as has been previously described. The conduit 24 is closed to fluid flows, of course. The rate determinations for this embodiment are by the same parameters as earlier described. However, the gravitational forces are inverted in effect to the viscous forces so that natural gas interface 32 will move vertically downward.

It will be apparent that by the preceding steps various displacing fluids may be employed in the method of this invention to obtain substantial improvements in the volumetric sweep of a vertically moved flooding front. Additionally, to the obtaining of the desired horizontal extension of the flooding fluid, the tendency of the displacing fluid-oil interfaces 31 and 32 to develop nonplanar irregularities such as fingers, cusps, and cones is reduced to a minimum. This situation is also additionally improved by making the distance between the input and output well means greater than the vertical dimension of the reservoir 11 to be swept by the flooding front.

As a result of the steps of this invention, the high volumetric sweep of the injected fluid resembles the vertical movement of these fluids with horizontal interfaces in a storage tank of oil. Additionally, these results are obtained by employing conventional well constructions and fluid-handling procedures.

From the foregoing it will be seen that all the stated objects of the present invention are attained by the present invention. Various changes and modifications may be made to the steps of the claimed method, as will be apparent to one skilled in the art, without departing from the spirit of this invention. In this regard, the description of the invention is illustrative and the claims solely recite the limitations of this invention.

What is claimed is:

1. A method for recovering oil from a subterranean reservoir by vertical flooding with an injected fluid which comprises:
   (a) providing spaced-apart input and output well means for conveying fluids between the earth's surface and a subterranean formation containing oil,
   (b) injecting a fluid for displacing oil from the input well means into the formation, said fluid being introduced into said formation at an upper horizon when said fluid is less dense than the oil and at a lower horizon when said fluid is more dense than the oil, and the fluid being injected at the rate where the magnitude of the viscous forces is decreased relative to the gravitational and capillary forces, which forces exist between the fluids and the formation, sufficiently to maintain the injected fluid interface with the oil substantially horizontal until said injected fluid extends from the input well means toward the output well means,
   (c) producing oil from said output well means at a rate not above the rate at which the fluid is being injected into the input well means, said oil being produced from one of the formation's oil producing horizons,
   (d) when the injected fluid extends horizontally substantially to the desired lateral distance from the input well means to the output well means, increasing the rate at which the fluid is injected into the input well means but not to such magnitude that the formation is fractured continuously thereby,
   (e) producing oil from the output well means at an increased rate but not exceeding that rate at which the fluid is then being injected, and said oil being produced at a horizon vertically opposite from the horizon at the input well means into which fluid is being injected into the formation,
   (f) controlling the rate of oil production at a magnitude slightly below that critical rate of petroleum production where opposing differential gravitational forces acting on the horizontal fluid-oil interface are exceeded by the pressure gradients in the formation adjacent the output well means to disrupt the planar interface, and
   (g) said oil production being continued until a substantial part of the formation is filled with the injected fluid.

2. The method of claim 1 where in step (b) a fluid more dense than the in-place oil is injected at a lower horizon in the reservoir.

3. The method of claim 2 where the injected fluid is water.

4. The method of claim 1 where in step (b) a fluid less dense than the in-place oil is injected at an upper horizon in the reservoir.

5. The method of claim 4 where the injected fluid is a light petroleum hydrocarbon.

6. The method of claim 1 wherein the fluid in step (b) has a rate of injection in each of steps (b) and (f) sufficiently slow that a stabilized bank of fluid-displaced oil is formed and preserved as the fluid traverses the reservoir both horizontally and vertically.

7. The method of claim 1 wherein, in step (c), the oil is produced from the output well means at a horizon vertically opposite from the horizon at the input well means into which fluid is being injected into the formation.

References Cited

UNITED STATES PATENTS

| | | | |
|---|---|---|---|
| 2,725,106 | 11/1955 | Spearow | 166—9 |
| 2,785,753 | 3/1957 | Spearow | 166—9 X |
| 2,821,255 | 1/1958 | Spearow | 166—10 |
| 2,859,818 | 11/1958 | Hall et al. | 166—9 |
| 2,874,777 | 2/1959 | Tadema | 166—11 |
| 2,897,894 | 8/1959 | Draper et al. | 166—9 |
| 2,946,382 | 7/1960 | Tek et al. | 166—11 |
| 3,073,386 | 1/1963 | Bertuzzi | 166—9 |
| 3,129,758 | 4/1964 | Closmann | 166—11 |
| 3,167,121 | 1/1965 | Sharp | 166—11 |
| 3,199,586 | 8/1965 | Henderson et al. | 166—9 |

STEPHEN J. NOVOSAD, *Primary Examiner.*